United States Patent Office 2,969,343
Patented Jan. 24, 1961

2,969,343

ALKYLIDENE BIS-INDANOLS AS DETERIORATION RETARDERS FOR RUBBERS

Roger E. Morris, Cuyahoga Falls, Ohio, assignor to The B. F. Goodrich Company, New York, N.Y., a corporation of New York No Drawing. Filed Sept. 10, 1956, Ser. No. 608,692

7 Claims. (Cl. 260—45.95)

This invention relates to the preservation and protection of organic materials subject to deterioration on aging and/or in service, and more particularly to the preservation and protection of rubber and rubber products, by the incorporation into such materials and products of one or more of a new class of chemical compounds.

The new class of chemicals comprises the reaction products of an indanol or a substituted indanol with an aldehyde, which reaction products are sometimes herein for convenience referred to as "alkylidene bis-indanols" or "alkylidene-bridged bis-indanols," and which reaction products applicant has discovered to function as extremely effective deterioration retarders for organic materials and especially for rubber and rubber products.

In vulcanized rubber products subjected in service to continuous flexing and/or to heat, as for example, a rubber tire, either pneumatic or solid, and a rubber belt, especially a belt operating on small pulleys and/or at high speeds, the new class of chemicals of this invention has been found to impart to the vulcanized rubber remarkably high anti-flex-cracking properties and excellent heat-stabilizing properties, as well as extremely effective resistance to loss of tensile strength, elongation and other desirable properties of newly vulcanized rubber products. The deterioration retarders of this application are, furthermore, non-staining and non-discoloring, and hence are particularly well adapted for use in white or light-colored rubber stocks, and are outstanding when used in white sidewall stocks of automobile tires and in the rubber stocks contiguous to the white sidewalls.

The indanols utilized as starting reactants in the production of the alkylidene bis-indanol deterioration retarders of this application are of the general formula

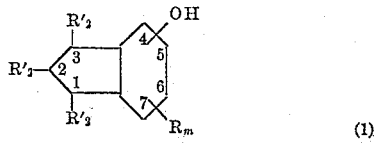

(1)

wherein the OH group is attached to a carbon atom of the phenyl ring of the indan group in either the 4- or the 5-position, or in either the 7- or the 6-position; each of the carbon atoms of the phenyl ring which has a replaceable hydrogen atom attached thereto and is positioned ortho or para to the carbon atom to which the OH group is attached being a carbon atom in an open reactive position; R represents a monovalent hydrocarbon substituent selected from the class consisting of hydrogen and alkyl and aralkyl radicals having from 1 to 8 carbon atoms; $m$ is 1; and R' represents a monovalent substituent selected from the class consisting of hydrogen and alkyl radicals having from 1 to 8 carbon atoms, each R' being attached to a carbon atom of the indan group in the divalent 1-, 2- and 3-positions, and each R and R' representing the same or a different monovalent substituent.

The structure of either of the symmetrical forms

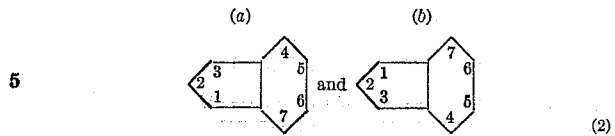

(2)

is an "indan" group, from which structures it will be noted that the 4- and 7-positions and the 5- and 6-positions are corresponding positions. In order to simplify the description herein, reference will be made herein only to the $a$ structure, with the understanding that the description applies equally as well to the $b$ structure, and 4-hydroxy indan and 5-hydroxy indan (also referred to as 4-indanol and 5-indanol) include 7-hydroxy indan and 6-hydroxy indan (7-indanol and 6-indanol), respectively.

In the indanols of above Formula 1, $m$ may be either 0 or 1. Where $m$ is 0, there are two open reactive carbon atoms in the phenyl ring, ortho and/or para to the OH group. Thus, where the OH group is attached to a carbon atom in the 4-position, the carbon atoms in the ortho 5-position and in the para 7-position are open reactive carbon atoms, and make possible the attachment of the alkylidene group of the aldehyde in either the 5-position or the 7-position, or both. Similarly, where the OH group is attached to a carbon atom in the 5-position, the carbon atoms in the ortho 4-position and in the ortho 6-position are open reactive carbon atoms, and make possible the attachment of the alkylidene group of the aldehyde in either the 4-position or in the 6-position, or both, with the 6-position being more highly reactive. However, where $m$ is 1, the radical R is attached to one of the two open reactive carbon atoms in the phenyl ring, all as above set forth, the other reactive carbon atom is open for reaction with the aldehyde.

The indanols which have been found to be preferred as starting compounds in the production of the deterioration retarders of this application may be grouped in the four following classes:

(a) Indanols of the general Formula 1 in which $m$ is 0 and each R' is a hydrogen atom, and which include 4-indanol and 5-indanol;

(b) Indanols of the general Formula 1 above, in which $m$ is 1 and each R' is a hydrogen atom, and which include, to enumerate certain typical examples, the following: 5-methyl-4-indanol, 7-methyl-4-indanol, 4-methyl-5-indanol, 6-methyl-5-indanol, and higher homologues including radicals within the above definition of R, such as ethyl, the propyls, butyls, amyls, hexyls, heptyls, octyls, etc., as well as radicals containing aryl and cyclic groups, such as benzyl, methyl benzyl, toluyl, the methyl toluyls, xylyl, the methyl xylyls, and the homologues of any of them;

(c) Indanols of the general Formula 1 above in which one or more of the R's attached to carbon atoms in the 1-, 2- and/or 3-positions of the indan group are radicals within the definition of R' above, and which include, to enumerate typical examples, 1-methyl-4-indanol,
1,1-dimethyl-4-indanol,
1,3-dimethyl-4-indanol,
1,1,3-trimethyl-4-indanol,
1,1,5-trimethyl-4-indanol,
1,1,7-trimethyl-4-indanol,
1,1,3,5-tetramethyl-4-indanol,
1,1,3,7-tetramethyl-4-indanol,
1,1-dimethyl-3-isopropyl-4-indanol,
1,1-dimethyl-3-isopropyl-5-t-butyl-4-indanol,
1-methyl-5-indanol,
1,1-dimethyl-5-indanol, 1,3-dimethyl-5-indanol,
1,1,3-trimethyl-5-indanol,
1,1,4-trimethyl-5-indanol,
1,1,6-trimethyl-5-indanol,
1,1,3,4-tetramethyl-5-indanol,
1,1,3,6-tetramethyl-5-indanol,
1,1-dimethyl-3-isopropyl-5-indanol,
1,1-dimethyl-3-isopropyl-4-t-butyl-5-indanol, and similar higher homologues, such as ethyl, the propyls, butyls, amyls, hexyls, heptyls, octyls, etc., as well as radicals containing aryl and cyclic groups; and (d) Indanols of the general Formula 1 above in which the indanols are mono-alkylated indanols, including, to enumerate only a few typical examples, 6-ethylated-5-indanol,
6-isopropylated-5-indanol,
6-t-butylated-5-indanol,
1,3-dimethyl-6-ethylated-5-indanol,
1,1,3-trimethyl-6-isopropylated-5-indanol,
1,3-dimethyl-6-alpha-methylbenzylated-5-indanol, and other mono-alkylated indanols disclosed in my copending application, Serial No. 608,699, filed September 10, 1956, now U.S. Patent No. 2,948,704, issued August 9, 1960.

It is to be understood that the above indicated indanols are illustrative only and are not to be considered in limitation of the invention of this application.

The aldehydes employed as starting materials in the production of the deterioration retarders of this application are of the general formula $$R''-\underset{\underset{H}{|}}{C}=O \qquad (3)$$

wherein R'' represents hydrogen or an alkyl, aryl, aralkyl, alkaryl, alkylene, arylene, alkarylene, aralkylene or like radical having from 1 to 8 carbon atoms. The formula comprehends any aldehyde from natural or synthetic sources. Preferably such aldehydes as a formaldehyde, acetaldehyde, propionaldehyde, n-butylaldehyde, isobutylaldehyde, n-valeraldehyde, n-capronaldehyde, n-heptaldehyde, n-octylaldehyde, and higher homologues, and also branched-chain aldehydes, such as 2-ethylhexylaldehyde and the like, as well as cyclicaldehydes, such as benzaldehyde, methyl benzaldehyde, dimethyl benzaldehyde and the so-called unsaturated aldehydes such as acrolein, crotonaldehyde, alpha-beta-dimethylacrolein, alpha-methyl-beta-ethylacrolein, and the like.

The indanols of Formula 1 above and the aldehydes of Formula 3 above, according to the invention of this application, react to produce alkylidene bis-indanols of the following general formula:

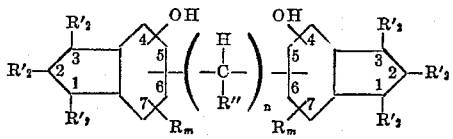

wherein each of the OH groups is attached to a similarly positioned carbon atom of a different indan group in a position selected from the 4- and the 5-positions,

is a divalent alkylidene bridging group attached to an open reactive carbon atoms of each of the indan groups in a similar position, which position is selected from a class consisting of ortho and para positions to the carbon atom to which the OH group is attached, that is, selected from the 5- and the 7-positions where the OH groups are in the 4-positions and selected from the 4- and the 6-positions where the OH groups are in the 5-positions, R is a monovalent hydrocarbon radical selected from a class consisting of alkyl, aryl, alkaryl, aralkyl, cycloalkyl, alkoxyl and aroxyl radicals having from 1 to 12 carbon atoms, R' and R'' each represents a monovalent substituent selected from a class consisting of hydrogen and alkyl, aryl, alkaryl, aralkyl and cycloalkyl radicals having from 1 to 12 carbon atoms, each R, R' and R'' representing the same or a different monovalent substituent, m is a digit either 0 or 1, n is an integer either 1 or 2, and the sum of m and n is an integer either 1 or 2.

For convenience in description in the specification and claims, the divalent

radical is referred to as a divalent alkylidene bridging group, using the term "alkylidene" in a broad sense, commonly used in industry, to comprehend all species within that divalent radical in which R'' has the significance above indicated. It is to be noted that the divalent alkylidene bridging group connects two indan groups by attachment to a carbon atom in an open reactive position in each of the two indan groups. To illustrate:

(a) Where m is 0, two reactive carbon atoms, ortho or para to the carbon atom to which the OH group is attached, that have a replaceable hydrogen atom attached thereto, are in reactive positions in the indanol molecule. Upon reaction of such an indanol with an aldehyde, normally one divalent alkylidene bridging group will attach to similarly positioned reactive carbon atoms in each of the two indanol molecules to produce an alkylidene-bridged bis-indanol. A second divalent alkylidene bridging group may attach to another reactive carbon atom in each of the two indanol molecules to produce a di-alkylidene-bridged bis-indanol.

It also is possible, where m is 0, that certain multiple chain-bridged indanols may be produced in very small quantities, in addition to the bis-indanols described in the preceding paragraph. Thus, a second divalent alkylidene bridging group may, under certain conditions, attach, through one of its two free valencies, to another reactive carbon atom in one of the two indanol molecules bridged by the first bridging group, and, through the other of its two free valencies, to a reactive carbon atom of a third indanol molecule. Likewise, a third divalent alkylidene bridging group may attach, through one of its two free valencies, to another reactive carbon atom of the other of the two indanol molecules bridged by the first bridging group, and, through the other of its two free valencies, to a reactive carbon atom of a fourth indanol molecule. These multiple-bridged indanols are generally considered as by-products of the main reaction.

(b) Where m is 1, the R is attached to one of the two reactive carbon atoms, leaving only one carbon atom in a reactive position. Upon reaction of such an indanol with an aldehyde, only one divalent alkylidene bridging group can attach to the similarly positioned reactive carbon atoms in each of the two indanol molecules to which R is not attached, producing a monoalkylidene-bridged bis(R-substituted-indanol). Thus, where 6-t-butylated-5-indanol is reacted with formaldehyde, 4,4'-methylidene bis(6-t-butylated-5-indanol) is produced.

In carrying out the reactions of this invention, a suitable catalyst is preferably employed. Satisfactory results have been obtained with such acidic condensation catalysts as sulfuric acid, p-toluene sulfonic acid, hydrochloric acid, and the like. The amount of catalyst is not critical.

The amount of the reaction product of this invention that may be effectively employed in rubber compositions ranges from 0.3 to about 10 weight percent based on the rubber, whereas to obtain maximum value of the deterioration retarder an amount ranging from about 0.5 to 5 weight percent on the rubber will give satisfactory results.

The term "rubber" is employed in this application in a generic sense to include all natural and synthetic unsaturated rubbery polymeric materials. The term "rubbery diolefinic polymer" is employed in this application to include the various natural rubbers, which are regarded as naturally occurring polymers of conjugated dienes, and synthetic rubbers which are polymers of conjugated dienes, such as butadiene-1,3, isoprene, piperylene, and other butadiene-1,3 hydrocarbons, chloroprene, cyanobutadiene-1,3, and the like, as well as copolymers of any of these conjugated dienes with each other and also copolymers of any of these conjugated dienes with other unsaturated chemical compounds copolymerizable therewith, such as styrene, chlorostyrene, isobutylene, acrylonitrile, methacrylonitrile, acrylic and methacrylic acids, alkyl acrylates and methacrylates, vinylidene chloride, vinyl pyridines and the like.

In general, in the preparation of the reaction products of this application, the reaction is carried out in any of the standard reaction vessels, since the temperatures and pressures employed are relatively low and necessitate no special equipment. Preferably the reaction vessel is equipped with a thermometer, an agitator, a reflux condensor venting to the atmosphere, an inlet tube for introducing fluid into the bottom portion of the vessel and/or a liquid dropper for feeding liquids dropwise into the vessel.

The reaction of the indanols and the aldehydes is generally carried out at substantially atmospheric pressures and at temperatures ranging from 25° to 95° C. but it is to be understood that the temperatures at which the reaction takes place are not critical.

EXAMPLE I

The reaction vessel is charged with 15 g. (0.112 mole) of 5-indanol, 9 g. (0.112 mole) of 37% formaldehyde, 75 milliliters of benzene and 10 drops of concentrated hydrochloric acid with agitation. The admixture is warmed slowly to about 65° C. over a period of about 4 hours, and heating is continued at about 63° to 69° C. for about 2½ hours, agitating the vessel contents throughout these periods. The reaction mixture is allowed to cool, and then poured into water, and allowed to separate into two layers, an organic layer and a water layer. The organic layer is washed thoroughly with sodium bicarbonate and again with water. The organic layer is dried and concentrated, the last traces of benzene being removed under somewhat reduced pressure. The residue, a slightly colored plastic mass, is in large part, 6,6'-methylidene bis(5-indanol). In different runs, this product ranges from a somewhat soft plastic mass to a hard brittle glass-like appearance at room temperature, depending on the completeness of the reaction.

EXAMPLE II

The reaction vessel is charged with 15 g. (0.112 mole) of 4-indanol, 9 g. (0.112 mole) of 37% formaldehyde, 75 milliliters of benzene and 20 drops of concentrated hydrochloric acid with agitation. The mixture is warmed slowly to about 65° C. and allowed to reflux with agitation for about 5 hours. The reaction mixture is allowed to cool, and then poured into water and allowed to separate into two layers. The organic layer is washed thoroughly with sodium bicarbonate and again with water. The organic layer is dried and concentrated, the last traces of benzene being removed under somewhat reduced pressure. The reaction product ranges from a somewhat soft plastic mass to a hard brittle glassy material, depending on the completeness of the reaction, and is in large part 5,5'-methylidene bis(4-indanol).

EXAMPLE III

The alkylated indanols may be also utilized in place of the unsubstituted indanols. Thus, the reaction vessel is charged with 228 g. (1.2 moles) of 6-t-butyl-5-indanol, 18 g. (0.6 mole) of paraformaldehyde, 300 milliliters of benzene and 20 milliliters of concentrated hydrochloric acid. The reaction mixture is heated slowly and allowed to reflux over a period of about 1½ hours with agitation. Refluxing and agitation are continued for about 4½ hours, during which time a large amount of white solid appears. The hot mixture is admixed with 100 milliliters of water and is allowed to stand overnight. The solids are collected by suction filtration, pressed out well and washed with 50 milliliters of hexane. After drying under reduced pressure, there remains 201.5 g. of a white crystalline solid having a melting point of 197°–200° C. which is 4,4'-methylidene bis(6-t-butyl-5-indanol).

EXAMPLE IV

As an example of the utilization of an aromatic aldehyde, benzaldehyde reacts with 5-indanol to produce 6,6'-benzylidene bis(5-indanol). Following the procedure of Example III, a reaction vessel is charged with 134 g. (1 mole) of 5-indanol, 53 g. (0.5 mole) of benzaldehyde, 300 milliliters of benzene and 20 milliliters of concentrated hydrochloric acid, with agitation. The reaction mixture is heated slowly and allowed to reflux over a period of 2 hours with agitation. Then refluxing and agitation are continued for 4½ hours. The reaction mixture is washed, thoroughly dried and concentrated by distilling off the solvents. The residue is treated with acetone and a white powder separates out which on crystallization yields a powder melting at 164°–165° C., and which on analysis and test is shown to be 6,6'-benzylidene bis(5-indanol) and to be an excellent deterioration retarder.

*Evaluation of reaction products of Examples I to IV*

(a) *Preparing test dumbbells.*—The efficacy of the reaction products of Examples I to IV above as flex-cracking resisters and heat stabilizers in vulcanized rubber products is demonstrated by incorporating each such reaction product in a standard natural rubber tread stock recipe, curing in a steam press, and then testing. The tread stock recipe employed for this test is:

| Ingredients | Parts by Weight |
| --- | --- |
| Natural crude rubber | 100.0 |
| Carbon black | 50.0 |
| Zinc oxide | 5.0 |
| Stearic acid | 3.0 |
| Sulfur | 3.0 |
| Bis(2-benzothiazyl)-disulfide (accelerator) | 1.0 |
| Reaction product of Examples I to IV | 1.0 |

Four rubber stocks, each compounded in accord with the above recipe and one containing each of the four reaction products of Examples I to IV, are compounded and cured. A blank stock, that is, one without a deterioration retarder, but otherwise the same as the above recipe, and a control stock having 1 part of phenyl-beta-naphthylamine replacing the 1 part of the reaction product of the above recipe, are also compounded and cured under like conditions for comparison purposes.

(b) *Determining heat stability and flex-like after aging.*—Each of the compounded stocks referred to in the preceding paragraph is cured in a regulation steam press at 280° F. for 50 and 80 minutes and then aged. The aging follows the standard ASTM procedure (D865–48T). Test dumbbell strips are cut from the vulcanized stocks and aged in open test tubes for 24 and 48 hours at 212° F. Some of these aged test strips are subjected to stress-strain tests. Others of the aged test strips, which are aged for 24 hours at 212° F., are subjected to flexing tests in the DeMattia Flexing Machine, where the test strips are flexed and the number of flexures automatically counted and recorded. The following test results are obtained:

| Test Dumbbells | Percentage of Original Tensile Strength Retained After Aging at 212° F. | | | | Flex-Life | |
|---|---|---|---|---|---|---|
| | 24 Hrs. 50" Cure | Aging 80" Cure | 48 Hrs. 50" Cure | Aging 80" Cure | No. of Flexes to Failure | Improvement Times over Blank |
| Blank—no deterioration retarder | 56 | 46 | 32 | 31 | 30,000 | 1.0 |
| Control—Phenyl-beta-naphthylamine | 78 | 64 | 55 | 49 | 132,000 | 4.4 |
| Reaction Product—Example I | 93 | 80 | 70 | 62 | 220,000 | 7.3 |
| Reaction Product—Example II | 93 | 88 | 82 | 76 | 210,000 | 7.0 |
| Reaction Product—Example III | 95 | 86 | 69 | 56 | 180,000 | 6.0 |
| Reaction Product—Example IV | 94 | 84 | 70 | 60 | 190,000 | 6.3 |

From the above tabulation, it will be observed that the heat-stabilizing properties of the reaction products of the Examples I to IV are markedly superior to those of the blank and of the phenyl-beta-naphthylamine, one of the most widely used antioxidants, and the flex-life of the rubber tread stocks, compounded with the reaction products of Examples I to IV, is from 6 to 7 times longer than that of the blank stock and nearly 2 times longer than that of the stock containing phenyl-beta-naphthylamine.

Applicant has found that the reaction products of indanols and alkylated indanols with aldehydes within the scope of the reactants as hereinabove more fully set forth have comparable excellent heat-stabilizing, flexing-life and other deterioration properties.

As has been above indicated, the starting indanol may have radical substituents on the 6-membered ring portion of the indan group or on the 5-membered ring portion of the indan group, or on both, and react with an aldehyde to produce the effective deterioration retarders of this invention. The following are given as illustrative:

EXAMPLE V

As an example of a reaction product of an aldehyde and an indanol having hydrocarbon substituents on the divalent carbon atoms of the 5-membered ring portion of the indan group, following the procedure of Example I, 1,1,3-trimethyl-5-indanol is reacted with formaldehyde to yield a viscous syrup which on analysis and test is shown to be largely 6,6'-methylidene bis(1,1,3-trimethyl-5-indanol) and to be an effective deterioration retarder.

EXAMPLE VI

As an example of a reaction product of an aldehyde and an indanol having hydrocarbon substituents on both the 5-membered ring portion and the 6-membered ring portion of the indan group, following the procedure of Example I, 1,1,3,6-tetramethyl-5-indanol is reacted with formaldehyde to yield a soft plastic solid. Analysis and test show the product to be largely 4,4'-methylidene bis-(1,1,3,6-tetramethyl-5-indanol) and to be an excellent deterioration retarder.

EXAMPLE VII

As an example of a reaction product of an aldehyde and an indanol having different hydrocarbon substituents attached to the carbon atoms on the 5-membered ring portion of the indan group, and also a hydrocarbon substituent on the 6-membered ring portion of the indan group, following the procedure of Example I, 1,6-dimethyl-3-ethyl-5-indanol is reacted with formaldehyde to yield 4,4'-methylidene bis(1,6-dimethyl-3-ethyl-5-indanol) which tests show to be an excellent deterioration retarder.

EXAMPLE VIII

As illustrative of a higher aldehyde reacting with an alkylated indanol, following the procedure of Example III, 6-t-butyl-5-indanol is reacted with paraaldehyde to produce, after crystallization from hexane, a crystalline solid that melts at 183.5°–185° C. and which analysis and test show to be 4,4'-ethylidene bis(6-t-butyl-5-indanol) and to be an excellent deterioration retarder.

EXAMPLE IX

As further illustrating the higher aldehydes reacting with an indanol, following the procedure of Example III, isobutyraldehyde is reacted with 5-indanol to produce a crystalline solid, which after recrystallization from a hexane-benzene solution, yields a white crystalline powder which melts at 218°–221° C. Analysis and test show the crystalline product to be 6,6'-isobutylidene bis(5-indanol) and to be an excellent deterioration retarder.

EXAMPLE X

As illustrating more highly substituted indanols as a starting material in the reaction, following the procedure of Example I, 1,1-dimethyl-3-isopropyl-5-t-butyl-4-indanol is reacted with formaldehyde to produce 7,7'-methylidene bis(1,1-dimethyl-3-isopropyl-5-t-butyl-4-indanol), which is an excellent deterioration retarder.

Numerous other alkylidene-bridged bis-indanols have been prepared and tested as deterioration retarders and all have been found to be excellent deterioration retarders.

On the basis of the tests made, the generalization is warranted that the alkylidene-bridged bis-indanols of the character hereinabove described are as a class highly effective as deterioration retarders and impart to vulcanized rubber remarkably high anti-flex-cracking and heat-stabilizing properties, very effective resistance to deterioration of tensile strength, elongation and other desirable properties, and are moreover non-staining and non-discoloring deterioration retarders.

It is not the intention of the applicant to limit the invention of this application to the specific disclosures herein set forth, which have been presented as illustrative, since modifications in the proportions and the types of materials employed may be varied and equivalent materials may be employed, where desirable, without departing from the spirit or scope of this invention as defined in the appended claims.

What is claimed is:

1. A sulfur-vulcanized rubbery composition having highly efficient anti-flex-cracking properties and superior heat-stabilizing properties, which composition comprises a vulcanized rubbery diolefinic polymer having dispersed therein from 0.3 to 10.0 weight percent on the said polymer of an alkylidene-bridged bis-indanol of the general formula

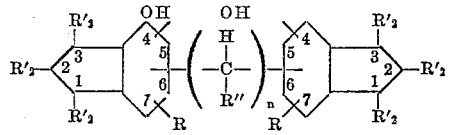

wherein R and R" each represents a monovalent substituent selected from the class consisting of hydrogen, and alkyl and aralkyl radicals having from 1 to 8 carbon atoms, R' represents a monovalent substituent selected from the class consisting of hydrogen and alkyl radicals having from 1 to 8 carbon atoms, and $n$ is an integer ranging from 1 to 2.

2. The sulfur-vulcanized rubbery composition defined in claim 1 in which the alkylidene-bridged bis-indanol is 6,6'-methylidene bis(5-indanol).

3. The sulfur-vulcanized rubbery composition defined in claim 1 in which the alkylidene-bridged bis-indanol is 4,4'-ethylidene bis(6-t-butyl-5-indanol).

4. The sulfur-vulcanized rubbery composition defined in claim 1 in which the alkylidene-bridged bis-indanol is 6,6'-benzylidene bis(5-indanol).

5. The sulfur-vulcanized rubbery composition defined in claim 1 in which the alkylidene-bridged bis-indanol is 6,6'-methylidene bis(1,1,3-trimethyl-5-indanol).

6. The sulfur-vulcanized rubbery composition defined in claim 1 in which the alkylidene-bridged bis-indanol is 4,4'-methylidene bis(1,6-dimethyl-3-ethyl-5-indanol).

7. The method of producing a sulfur-vulcanized rubbery composition having highly efficient anti-flex-cracking properties and superior heat stabilizing properties, which method comprises vulcanizing a vulcanizable rubbery di-olefinic polymer having dispersed therein from 0.3 to 10 weight percent on the said polymer of an alkylidene-bridged bis-indanol of the general formula

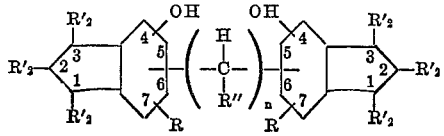

wherein R and R" each represents a monovalent substituent selected from the class consisting of hydrogen, and alkyl and aralkyl radicals having from 1 to 8 carbon atoms, R' represents a monovalent substituent selected from the class consisting of hydrogen and alkyl radicals having from 1 to 8 carbon atoms, and $n$ is an integer ranging from 1 to 2.

References Cited in the file of this patent
UNITED STATES PATENTS

| | | |
|---|---|---|
| 2,109,015 | Niederl | Feb. 22, 1938 |
| 2,274,367 | Ingram | Feb. 24, 1942 |
| 2,731,442 | Forman | Jan. 17, 1956 |
| 2,731,443 | Forman | Jan. 17, 1956 |
| 2,734,088 | Knowles | Feb. 7, 1956 |
| 2,754,285 | Petropoulos | July 10, 1956 |
| 2,775,620 | Williamson | Dec. 25, 1956 |
| 2,819,249 | Petropoulos | Jan. 7, 1958 |